(12) United States Patent
Buelow et al.

(10) Patent No.: US 8,575,244 B2
(45) Date of Patent: Nov. 5, 2013

(54) SOLVENTS IN THE PREPARATION OF POLYURETHERANE DISPERSIONS

(75) Inventors: Gerd Buelow, Maxford (DE); Manfred Dargatz, Worms (DE); Karl Haeberle, Speyer (DE); Maria Teresa Hechavarria Fonseca, Buerstadt (DE); Karl Ott, Plankstadt (DE); Juan Salgado-Valle, Hospitalet de Llobregat (ES); Tobias Wabnitz, Mannheim (DE)

(73) Assignee: BASF SE, Ludwigshafen (DE)

( * ) Notice: Subject to any disclaimer, the term of this patent is extended or adjusted under 35 U.S.C. 154(b) by 27 days.

(21) Appl. No.: 13/375,923

(22) PCT Filed: Jun. 7, 2010

(86) PCT No.: PCT/EP2010/057868
§ 371 (c)(1),
(2), (4) Date: Dec. 2, 2011

(87) PCT Pub. No.: WO2010/142617
PCT Pub. Date: Dec. 16, 2010

(65) Prior Publication Data
US 2012/0076932 A1    Mar. 29, 2012

(30) Foreign Application Priority Data

Jun. 10, 2009   (EP) .................................. 09162414

(51) Int. Cl.
*C08K 5/3415*    (2006.01)
*B05D 5/10*    (2006.01)

(52) U.S. Cl.
USPC .................... 524/104; 524/726; 427/207.1

(58) Field of Classification Search
USPC ................... 524/104, 726; 427/207, 207.1
See application file for complete search history.

(56) References Cited

U.S. PATENT DOCUMENTS

2007/0197720 A1    8/2007  Ott et al.

FOREIGN PATENT DOCUMENTS

| WO | 2005 090430 | 9/2005 |
| WO | 2008 012231 | 1/2008 |

OTHER PUBLICATIONS

International Search Report Issued Aug. 10, 2010 in PCT/EP10/057868 Filed Jun. 7, 2010.

*Primary Examiner* — Kriellion Sanders
(74) *Attorney, Agent, or Firm* — Oblon, Spivak, McClelland, Maier & Neustadt, L.L.P.

(57) ABSTRACT

The present invention relates to substituted N-(cyclo)alkylpyrrolidones as solvents for use in processes for preparing polyurethane dispersions.

17 Claims, No Drawings

SOLVENTS IN THE PREPARATION OF POLYURETHERANE DISPERSIONS

The present invention relates to substituted N-(cyclo)alkylpyrrolidones as solvents for use in processes for preparing polyurethane dispersions.

Polyurethane dispersions are often produced industrially using the process known as the "prepolymer mixing technique". In that process polyurethanes are first prepared in an organic solvent, frequently N-methylpyrrolidone, and the resulting polyurethane solution is subsequently dispersed in water. During and/or after its dispersing in water the polyurethane can then have its molar mass increased further by chain extension.

Depending on the boiling point of the solvent used and even in the case of distillative removal the solvent remains to a greater or lesser extent in the dispersion, where it then affects the properties of the polyurethane dispersion.

Since not all solvents are toxicologically unobjectionable, the solvent used should as far as possible be nontoxic. WO 2005/090 430 A1 teaches the use of N-(cyclo)-alkylpyrrolidones with (cyclo)alkyl radicals having 2 to 6 C atoms for this purpose. Pyrrolidones other than N-substituted pyrrolidones are not disclosed. However, there are indications in accordance with which it could be supposed that N-(cyclo)alkylpyrrolidones as well, especially N-ethylpyrrolidone, might lead to deleterious toxicological effects, particularly if it were to be taken orally. There is therefore a further need for solvents for the synthesis of polyurethane dispersions.

An object of the present invention was to provide solvents for preparing polyurethane dispersions by the prepolymer mixing technique that have a beneficial effect on the properties of the resultant polyurethane dispersion.

This object of the invention is achieved by means of a process for preparing polyurethane dispersions which comprises preparing the polyurethane prior to dispersing in the presence of a substituted N-(cyclo)alkylpyrrolidone (SOAP) of formula 1

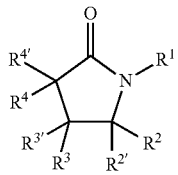

where $R^1$ is a (cyclo)alkyl radical having 1 to 18 C atoms and $R^2$, $R^{2\prime}$, $R^3$, $R^{3\prime}$, $R^4$ and $R^{4\prime}$ are each a hydrogen atom or a (cyclo)alkyl radical having 1 to 18 C atoms, with the proviso that at least one of the groups $R^2$, $R^{2\prime}$, $R^3$, $R^{3\prime}$, $R^4$ and $R^{4\prime}$ is other than an H atom.

Substituted N-(cyclo)alkylpyrrolidones suitable in accordance with the invention are those having an aliphatic (open-chain) or cycloaliphatic (alicyclic, annular) hydrocarbon radical, preferably an open-chain, branched or unbranched hydrocarbon radical $R^1$, comprising 1 to 6 carbon atoms, preferably 1 to 4, more preferably 1 to 3, in particular 1 to 2 and most especially 1 carbon atom, and also having at least one, one to six for example, preferably one to three, more preferably one to two, and very preferably just one aliphatic or cycloaliphatic, preferably aliphatic, hydrocarbon radical as radicals $R^2$, $R^{2\prime}$, $R^3$, $R^{3\prime}$, $R^4$ and $R^{4\prime}$.

A "(cyclo)alkyl radical having 1 to 18 C atoms" for the purposes of this specification means an aliphatic, open-chain, branched or unbranched hydrocarbon radical having 1 to 18 carbon atoms or a cycloaliphatic hydrocarbon radical having 3 to 18 carbon atoms.

Examples of suitable cycloalkyl radicals are cyclopentyl, cyclohexyl, cyclooctyl and cyclododecyl.

Examples of suitable alkyl radicals are methyl, iso-propyl, n-propyl, n-butyl, iso-butyl, sec-butyl, tert-butyl and n-hexyl.

Preferred radicals are cyclohexyl, methyl, ethyl, iso-propyl, n-propyl, n-butyl, iso-butyl, sec-butyl and tert-butyl, particular preference being given to methyl, ethyl and n-butyl and very particular preference to methyl or ethyl, in particular methyl.

Preferred radicals $R^1$ are methyl, ethyl and cyclohexyl, more preferably methyl and ethyl, and very preferably methyl.

Preferred radicals $R^2$, $R^{2\prime}$, $R^3$, $R^{3\prime}$, $R^4$ and $R^{4\prime}$ are hydrogen, methyl, ethyl, iso-propyl and cyclohexyl, more preferably hydrogen, methyl, ethyl and iso-propyl, very preferably hydrogen, methyl and ethyl, and more particularly hydrogen and methyl.

Preferably at least one of the radicals $R^2$, $R^{2\prime}$, $R^3$, $R^{3\prime}$, $R^4$ and $R^{4\prime}$ is other than hydrogen, more preferably one to three, very preferably one to two, and more particularly just one.

Preferred compounds of the formula 1 are N-methyl-3-methylpyrrolidone, N-methyl-4-methylpyrrolidone, N-ethyl-3-methylpyrrolidone and N-ethyl-4-methylpyrrolidone, more preferably N-methyl-3-methylpyrrolidone and N-methyl-4-methylpyrrolidone, and also mixtures thereof.

Where mixtures are used, the mixtures in question are mixtures of up to four different substituted N-(cyclo)alkylpyrrolidones, preferably up to three and more preferably two.

In the latter case the two substituted N-(cyclo)alkylpyrrolidones are present generally in a weight ratio of 10:1 to 1:10, preferably 5:1 to 1:5, more preferably 3:1 to 1:3, and very preferably 2:1 to 1:2.

The amount of the substituted N-(cyclo)alkylpyrrolidones based on the polyurethane is generally 1-100% by weight, preferably 10-100% by weight.

The substituted N-(cyclo)alkylpyrrolidones used in accordance with the invention can of course be used alone, mixed together or also in a mixture with one or more other suitable solvents.

Examples of suitable solvents are, for example, open-chain or preferably cyclic carbonates, lactones, di(cyclo)alkyl dipropylene glycol ethers and N-(cyclo)alkyl-caprolactams.

Carbonates are described, for example in EP 697424 A1, particularly from page 4 lines 4 to 29 therein, hereby expressly incorporated by reference. Mention may preferably be made of 1,2-ethylene carbonate, 1,2-propylene carbonate and 1,3-propylene carbonate, more preferably 1,2-ethylene carbonate and 1,2-propylene carbonate.

Lactones that may be mentioned are preferably beta-propiolactone, gamma-butyrolactone, epsilon-caprolactone and epsilon-methylcaprolactone.

Di(cyclo)alkyl dipropylene glycol ethers are for example dipropylene glycol dimethyl ether, dipropylene glycol diethyl ether, dipropylene glycol di-n-propyl ether and dipropylene glycol di-n-butyl ether; dipropylene glycol dimethyl ether is preferred.

The di(cyclo)alkyl dipropylene glycol ether and particularly dipropylene glycol dimethyl ether generally comprises mixtures of the positional isomers and diastereomers. The precise composition of the isomer mixtures is not important to the invention. In general the principal isomer is

R—OCH$_2$CH(CH$_3$)OCH$_2$CH(CH$_3$)OR, in which R is the (cyclo)alkyl radical.

Dipropylene glycol dimethyl ether is available commercially as an isomer mixture of this kind and is generally identified by the CAS No. 111109-77-4. Dipropylene glycol dimethyl ether is available commercially in a high purity of usually above 99% by weight, for example under the trade name Proglyde® DMM from The Dow Chemical Company, Midland, Mich. 48674, USA, or from Clariant GmbH, 65840 Sulzbach am Taunus, Germany.

N-(Cyclo)alkylcaprolactams are those having an aliphatic (open-chain) or cycloaliphatic (alicyclic, annular), preferably open-chain, branched or unbranched hydrocarbon radical which comprises 1 to 6 carbon atoms, preferably 1 to 5, more preferably 1 to 4, in particular 1 to 3, and especially 1 or 2, carbon atoms.

Examples of N-(cyclo)alkylcaprolactams which can be used include N-methyl-caprolactam, N-ethylcaprolactam, N-n-propylcaprolactam, N-iso-propylcaprolactam, N-n-butylcaprolactam, N-iso-butylcaprolactam, N-sec-butylcaprolactam, N-tert-butylcaprolactam, N-cyclopentylcaprolactam or N-cyclohexylcaprolactam, preferably N-methylcaprolactam or N-ethylcaprolactam.

Furthermore, the substituted N-(cyclo)alkylpyrrolidone may also be added to a completed polyurethane dispersion, in other words after the dispersing of the polyurethane, in order, for example, to influence its leveling and drying behavior. It is preferred, however, to add the substituted N-(cyclo)alkylpyrrolidone prior to the dispersing operation.

In accordance with the invention the aqueous polyurethane dispersions are prepared by
I. preparing a polyurethane by reacting
  a) at least one polyfunctional isocyanate having 4 to 30 carbon atoms,
  b) diols of which
    b1) 10 to 100 mol %, based on the total amount of diols (b), have a molecular weight of from 500 to 5000 and
    b2) 0 to 90 mol %, based on the total amount of diols (b), have a molecular weight of from 60 to 500 g/mol,
  c) if desired, further polyfunctional compounds, other than the diols (b), containing reactive groups which are alcoholic hydroxyl groups or primary or secondary amino groups and
  d) monomers other than the monomers (a), (b) and (c), containing at least one isocyanate group or at least one isocyanato-reactive group, additionally carrying at least one hydrophilic group or one potentially hydrophilic group whereby the polyurethane is rendered dispersible in water,
  to form a polyurethane in the presence of a substituted N-(cyclo)alkylpyrrolidone
  and
II. subsequently dispersing the polyurethane in water
III. with the possible addition before, during and/or after step II, if appropriate, of polyamines.

Suitable monomers (a) include the polyisocyanates customarily employed in polyurethane chemistry, examples being aliphatic, aromatic and cycloaliphatic diisocyanates and polyisocyanates, the aliphatic hydrocarbon radicals containing for example 4 to 12 carbon atoms, the cycloaliphatic or aromatic hydrocarbon radicals containing for example 6 to 15 carbon atoms or the araliphatic hydrocarbon radicals containing for example 7 to 15 carbon atoms, having an NCO functionality of at least 1.8, preferably from 1.8 to 5 and more preferably from 2 to 4, and also their isocyanurates, biurets, allophanates and uretdiones.

The diisocyanates are preferably isocyanates having 4 to 20 carbon atoms. Examples of customary diisocyanates are aliphatic diisocyanates such as tetramethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, esters of lysine diisocyanate, tetramethylxylylene diisocyanate, trimethylhexane diisocyanate or tetramethylhexane diisocyanate, cycloaliphatic diisocyanates such as 1,4-, 1,3- or 1,2-diisocyanatocyclohexane, trans/trans, the cis/cis and the cis/trans isomer of 4,4'- or 2,4'-di(isocyanatocyclohexyl)-methane, 1-isocyanato-3,3,5-trimethyl-5-(isocyanatomethyl)cyclohexane (isophorone diisocyanate), 2,2-bis(4-isocyanatocyclohexyl)propane, 1,3- or 1,4-bis(isocyanato-methyl)cyclohexane or 2,4- or 2,6-diisocyanato-1-methylcyclohexane, and aromatic diisocyanates such as 2,4- or 2,6-tolylene diisocyanate and the isomer mixtures thereof, m- or p-xylylene diisocyanate, 2,4'- or 4,4'-diisocyanatodiphenylmethane and the isomer mixtures thereof, 1,3- or 1,4-phenylene diisocyanate, 1-chloro-2,4-phenylene diisocyanate, 1,5-naphthylene diisocyanate, diphenylene 4,4'-diisocyanate, 4,4'-diisocyanato-3,3'-dimethylbiphenyl, 3-methyldiphenylmethane 4,4'-diisocyanate, 1,4-diisocyanatobenzene or diphenyl ether 4,4'-diisocyanate.

Mixtures of said diisocyanates may also be present.

Preference is given to aliphatic and cycloaliphatic diisocyanates, and particular preference to isophorone diisocyanate, hexamethylene diisocyanate, meta-tetramethylxylylene diisocyanate (m-TMXDI) and 4,4'-di(isocyanatocyclohexyl)methane ($H_{12}$MDI).

Suitable polyisocyanates include polyisocyanates containing isocyanurate groups, uretdione diisocyanates, polyisocyanates containing biuret groups, polyisocyanates containing urethane groups or allophanate groups, polyisocyanates comprising oxadiazinetrione groups, uretonimine-modified polyisocyanates of linear or branched $C_4$-$C_{20}$-alkylene diisocyanates, cycloaliphatic diisocyanates having 6 to 20 carbon atoms in all or aromatic diisocyanates having 8 to 20 carbon atoms in all, or mixtures thereof.

The diisocyanates and polyisocyanates which can be used preferably have an isocyanate group (calculated as NCO, molecular weight=42) content of from 10 to 60% by weight based on the diisocyanate and polyisocyanate (mixture), more preferably from 15 to 60% by weight and very preferably from 20 to 55% by weight.

Preference is given to aliphatic and/or cycloaliphatic diisocyanates and polyisocyanates, examples being the above-mentioned aliphatic and cycloaliphatic diisocyanates, respectively, or mixtures thereof.

Preference extends to
1) Polyisocyanates containing isocyanurate groups and formed from aromatic, aliphatic and/or cycloaliphatic diisocyanates. Particular preference is given here to the corresponding aliphatic and/or cycloaliphatic isocyanato-isocyanurates and, in particular, to those based on hexamethylene diisocyanate and isophorone diisocyanate. The isocyanurates present are, in particular, trisisocyanatoalkyl or trisisocyanatocycloalkyl isocyanurates, which represent cyclic trimers of the diisocyanates, or are mixtures with their higher homologs containing more than one isocyanurate ring. The isocyanato-isocyanurates generally have an NCO content of from 10 to 30% by weight, in particular from 15 to 25% by weight, and an average NCO functionality of from 3 to 4.5.
2) Uretdione diisocyanates having aromatically, aliphatically and/or cyclo-aliphatically attached isocyanate groups, preferably aliphatically and/or cycloaliphatically attached isocyanate groups, and especially those derived from hexamethylene diisocyanate or isophorone diisocyanate. Uretdione diisocyanates are cyclic dimerization products of diisocyanates. In the formulations the uretdione diisocyanates can be used as sole component or in a mixture with other polyisocyanates, especially those specified under 1).

3) Polyisocyanates containing biuret groups and having aromatically, cycloaliphatically or aliphatically attached, preferably cycloaliphatically or aliphatically attached, isocyanate groups, especially tris(6-isocyanatohexyl)biuret or its mixtures with its higher homologs. These polyisocyanates containing biuret groups generally have an NCO content of from 18 to 22% by weight and an average NCO functionality of from 3 to 4.5.

4) Polyisocyanates containing urethane and/or allophanate groups and having aromatically, aliphatically or cycloaliphatically attached, preferably aliphatically or cycloaliphatically attached, isocyanate groups, as obtainable for example by reacting excess amounts of hexamethylene diisocyanate or of isophorone diisocyanate with polyhydric alcohols such as trimethylolpropane, neopentyl glycol, pentaerythritol, 1,4-butanediol, 1,6-hexanediol, 1,3-propanediol, ethylene glycol, diethylene glycol, glycerol, 1,2-dihydroxypropane or mixtures thereof. These polyisocyanates containing urethane and/or allophanate groups generally have an NCO content of from 12 to 20% by weight and an average NCO functionality of from 2.5 to 3.

5) Polyisocyanates comprising oxadiazinetrione groups, preferably derived from hexamethylene diisocyanate or isophorone diisocyanate. Polyisocyanates of this kind comprising oxadiazinetrione groups can be prepared from diisocyanate and carbon dioxide.

6) Uretonimine-modified polyisocyanates.

The polyisocyanates 1) to 6) can be used in a mixture, including if desired in a mixture with diisocyanates.

Particularly significant mixtures of these isocyanates are the mixtures of the respective structural isomers of diisocyanatotoluene and diisocyanatodiphenylmethane, particular suitability being possessed by the mixture composed of 20 mol % 2,4-diisocyanato-toluene and 80 mol % 2,6-diisocyanatotoluene. Also of particular advantage are the mixtures of aromatic isocyanates such as 2,4-diisocyanatotoluene and/or 2,6-diiso-cyanatotoluene with aliphatic or cycloaliphatic isocyanates such as hexamethylene diisocyanate or IPDI, the preferred mixing ratio of the aliphatic to aromatic isocyanates being from 4:1 to 1:4.

As compounds (a) it is also possible to employ isocyanates which in addition to the free isocyanate groups carry further, blocked isocyanate groups, e.g., uretdione or urethane groups.

If desired it is also possible to use those isocyanates which carry only one isocyanate group. In general their fraction is not more than 10 mol %, based on the overall molar amount of the monomers. The monoisocyanates normally carry other functional groups such as olefinic groups or carbonyl groups and serve for introducing, into the polyurethane, functional groups which allow it to be dispersed and/or crosslinked or to undergo further polymer-analogous reaction. Monomers suitable for this purpose include those such as isopropenyl-a,a-dimethylbenzyl isocyanate (TMI).

Diols (b) which are ideally suitable are those diols (b1) which have a relatively high molecular weight of from about 500 to 5000, preferably from about 100 to 3000 g/mol.

The diols (b1) are, in particular, polyesterpolyols, which are known, for example, from Ullmanns Encyklopädie der technischen Chemie, 4th Edition, Vol. 19, pp. 62 to 65. It is preferred to employ polyesterpolyols that are obtained by reacting dihydric alcohols with dibasic carboxylic acids. Instead of the free polycarboxylic acids it is also possible to use the corresponding polycarboxylic anhydrides or corresponding polycarboxylic esters of lower alcohols, or mixtures thereof, to prepare the polyesterpolyols. The polycarboxylic acids can be aliphatic, cycloaliphatic, araliphatic, aromatic or heterocyclic and can be optionally substituted, by halogen atoms, for example, and/or unsaturated. Examples are suberic, azelaic, phthalic, and isophthalic acid, phthalic, tetrahydrophthalic, hexahydrophthalic, tetrachlorophthalic, endomethylenetetrahydrophthalic, glutaric and maleic anhydride, maleic acid, fumaric acid and dimeric fatty acids. Preference is given to dicarboxylic acids of the general formula HOOC—$(CH_2)_y$—COOH, where y is a number from 1 to 20, preferably an even number from 2 to 20, examples being succinic, adipic, sebacic and dodecane-dicarboxylic acids.

Examples of suitable polyhydric alcohols are ethylene glycol, 1,2-propanediol, 1,3-propanediol, 1,3-butanediol, 1,4-butenediol, 1,4-butynediol, 1,5-pentanediol, neopentyl glycol, bis(hydroxymethyl)cyclohexanes such as 1,4-bis (hydroxymethyl)cyclohexane, 2-methyl-1,3-propanediol and also diethylene glycol, triethylene glycol, tetraethylene glycol, polyethylene glycol, dipropylene glycol, polypropylene glycol, dibutylene glycol and polybutylene glycols. Preference is given to neopentylglycol and alcohols of the general formula HO—$(CH_2)_x$—OH, where x is a number from 1 to 20, preferably an even number from 2 to 20. Examples of such alcohols are ethylene glycol, 1,4-butanediol, 1,6-hexanediol, 1,8-octanediol and 1,12-dodecanediol.

Also suitable are polycarbonatediols, as can be obtained, for example, by reaction of phosgene with an excess of the low molecular mass alcohols cited as synthesis components for the polyesterpolyols.

Lactone-based polyesterdiols are also suitable, these being homopolymers or copolymers of lactones, preferably hydroxy-terminal adducts of lactones with suitable difunctional starter molecules. Suitable lactones are preferably those derived from hydroxycarboxylic acids of the general formula HO—$(CH_2)_z$—COOH, where z is from 1 to 20, preferably an odd number from 3 to 19. Examples are e-caprolactone, β-propiolactone, γ-butyrolactone and/or methyl-e-caprolactone, and mixtures thereof. Examples of suitable starter components are the low molecular mass dihydric alcohols cited above as synthesis components for the polyesterpolyols. The corresponding polymers of e-caprolactone are particularly preferred. Lower polyesterdiols or polyetherdiols can also be employed as starters for preparing the lactone polymers. Instead of the polymers of lactones it is also possible to employ the corresponding, chemically equivalent polycondensates of the hydroxycarboxylic acids which correspond to the lactones.

Further suitable monomers (b1) are polyetherdiols. They are obtainable in particular by addition polymerization of ethylene oxide, propylene oxide, butylene oxide, tetrahydrofuran, styrene oxide or epichlorohydrin with itself, in the presence, for example, of $BF_3$, or by addition reaction of these compounds, alone or in a mixture or in succession, onto starter components containing reactive hydrogens, such as alcohols or amines, examples being water, ethylene glycol, 1,2-propanediol, 1,3-propanediol, 2,2-bis(4-hydroxydiphenyl)propane or aniline. Particular preference is given to polytetrahydrofuran having a molecular weight of from 500 to 5000 g/mol and, in particular, from 1000 to 4500 g/mol.

The polyester diols and polyether diols can also be employed as mixtures in proportions of from 0.1:1 to 1:9.

It is possible to employ as diols (b) not only the diols (b1) but also low molecular mass diols (b2) having a molecular weight of from about 50 to 500, preferably from 60 to 200 g/mol.

Compounds employed as monomers (b2) are in particular the synthesis components of the short-chain alkanediols cited for the preparation of polyesterpolyols, preference being given to the unbranched diols having from 2 to 12 carbons and an even number of carbons, and to 1,5-pentanediol and neopentyl glycol.

The proportion of the diols (b1), based on the total amount of diols (b), is preferably from 10 to 100 mol %, and the proportion of the diols (b2), based on the total amount of diols (b), is preferably from 0 to 90 mol %. With particular preference the ratio of the diols (b1) to the diols (b2) is from 0.2:1 to 5:1, especially from 0.5:1 to 2:1.

The monomers (c), which are different from the diols (b), serve generally for crosslinking or chain extension. They are generally nonaromatic alcohols with a functionality of more than two, amines having 2 or more primary and/or secondary amino groups, and compounds which as well as one or more alcoholic hydroxyl groups carry one or more primary and/or secondary amino groups.

Alcohols having a functionality greater than 2, which may serve to bring about a certain degree of crosslinking or branching, are for example trimethylolbutane, trimethylolpropane, trimethylolethane, pentaerythritol, glycerol, sugar alcohols, such as sorbitol, mannitol, diglycerol, threitol, erythritol, adonitol (ribitol), arabitol (lyxitol), xylitol, dulcitol (galactitol), maltitol or Isomalt, or sugars.

Also suitable are monoalcohols which in addition to the hydroxyl group carry a further isocyanate-reactive group, such as monoalcohols having one or more primary and/or secondary amino groups, monoethanolamine being one example.

Polyamines having two or more primary and/or secondary amino groups can be used in the prepolymer mixing technique particularly when the chain extension and/or crosslinking is to take place in the presence of water (step III), since amines generally react more quickly with isocyanates than do alcohols or water. This is frequently necessary when aqueous dispersions of crosslinked polyurethanes or polyurethanes of high molar weight are required. In such cases the approach taken is to prepare prepolymers containing isocyanate groups, to disperse them rapidly in water and then to subject them to chain extension or crosslinking by adding compounds having two or more isocyanate-reactive amino groups.

It is also possible to carry out the chain extension with polyamines having 2 primary and/or secondary amino groups prior to the operation of dispersing in water, as is taught, for example, in WO 02/98939.

Amines suitable for this purpose are generally polyfunctional amines of the molar weight range from 32 to 500 g/mol, preferably from 60 to 300 g/mol, which comprise at least two primary, two secondary or one primary and one secondary amino group(s). Examples of such are diamines such as diaminoethane, diaminopropanes, diamino-butanes, diaminohexanes, piperazine, 2,5-dimethylpiperazine, amino-3-aminomethyl-3,5,5-trimethylcyclohexane (isophoronediamine, IPDA), 4,4'-diaminodicyclohexyl-methane, 1,4-diaminocyclohexane, aminoethylethanolamine, hydrazine, hydrazine hydrate or triamines such as diethylenetriamine or 1,8-diamino-4-aminomethyloctane or higher amines such as triethylenetetramine, tetraethylenepentamine or polymeric amines such as polyethylenamines, hydrogenated polyacrylonitriles or at least partly hydrolyzed poly-N-vinylformamides, in each case having a molar weight of up to 2000, preferably up to 1000 g/mol.

The amines can also be used in blocked form, such as in the form of the corresponding ketimines (see, e.g., CA-1 129 128), ketazines (cf., e.g., U.S. Pat. No. 4,269,748) or amine salts (see U.S. Pat. No. 4,292,226). Oxazolidines as well, as used for example in U.S. Pat. No. 4,192,937, are blocked polyamines which can be used for preparing the polyurethanes for chain extending the prepolymers. When blocked polyamines of this kind are used they are generally mixed with the prepolymers in the absence of water and this mixture is subsequently mixed with the dispersion water or a portion thereof, so that the corresponding polyamines are liberated by hydrolysis.

Preference is given to using mixtures of diamines and triamines, and particular preference to mixtures of isophoronediamine and diethylenetriamine.

The fraction of polyamines can be up to 10, preferably up to 8 mol % and more preferably up to 5 mol %, based on the total amount of components (b) and (c).

The polyurethane prepared in step I may contain in general up to 10%, preferably up to 5%, by weight of unreacted NCO groups.

The molar ratio of NCO groups in the polyurethane prepared in step I to the sum of primary and secondary amino groups in the polyamine is generally chosen in step III so as to be between 3:1 and 1:3, preferably 2:1 and 1:2, more preferably 1.5:1 and 1:1.5, and very preferably 1:1.

A further possibility, for chain termination, is to use minor amounts—that is, preferably, amounts of less than 10 mol %, based on components (b) and (c)—of monoalcohols. They serve primarily to limit the molar weight of the polyurethane. Examples are methanol, ethanol, isopropanol, n-propanol, n-butanol, isobutanol, sec-butanol, tert-butanol, ethylene glycol monomethyl ether, ethylene glycol monoethyl ether, 1,3-propanediol monomethyl ether, n-hexanol, n-heptanol, n-octanol, n-decanol, n-dodecanol (lauryl alcohol) and 2-ethylhexanol.

In order to render the polyurethanes dispersible in water they are synthesized not only from components (a), (b) and (c) but also from monomers (d), which are different from components (a), (b) and (c) and carry at least one isocyanate group or at least one isocyanate-reactive group and, in addition, at least one hydrophilic group or a group which can be converted into hydrophilic groups. In the text below the term "hydrophilic groups or potentially hydrophilic groups" is abbreviated to "(potentially) hydrophilic groups". The (potentially) hydrophilic groups react with isocyanates much more slowly than do the functional groups of the monomers that are used to build up the polymer main chain. The (potentially) hydrophilic groups can be nonionic or, preferably, ionic, i.e., cationic or anionic, hydrophilic groups or can be potentially ionic hydrophilic groups, and with particular preference can be anionic hydrophilic groups or potentially anionic hydrophilic groups.

The proportion of the components having (potentially) hydrophilic groups as a fraction of the total amount of components (a), (b), (c) and (d) is generally made such that the molar amount of the (potentially) hydrophilic groups, based on the amount by weight of all monomers (a) to (d), is from 30 to 1000, preferably from 50 to 500 and more preferably from 80 to 300 mmol/kg.

Examples of suitable nonionic hydrophilic groups include mixed or pure polyethylene glycol ethers made up of preferably from 5 to 100, more preferably from 10 to 80, repeating ethylene oxide units. The polyethylene glycol ethers may also comprise propylene oxide units. Where such is the case the amount of propylene oxide units ought not to exceed 50%, preferably 30%, by weight based on the mixed polyethylene glycol ether.

The amount of polyethylene oxide units is generally from 0 to 10%, preferably from 0 to 6%, by weight based on the amount by weight of all monomers (a) to (d).

Preferred monomers containing nonionic hydrophilic groups are the polyethylene glycol and diisocyanates which carry a terminally etherified polyethylene glycol radical. Diisocyanates of this kind and also processes for their preparation are specified in U.S. Pat. No. 3,905,929 and U.S. Pat. No. 3,920,598.

Ionic hydrophilic groups are, in particular, anionic groups such as the sulfonate, the carboxylate and the phosphate group in the form of their alkali metal or ammonium salts and also cationic groups such as ammonium groups, especially protonated tertiary amino groups or quaternary ammonium group.

Suitable monomers containing potentially anionic groups are usually aliphatic, cycloaliphatic, araliphatic or aromatic monohydroxycarboxylic and dihydroxycarboxylic acids which carry at least one alcoholic hydroxyl group or one primary or secondary amino group.

Such compounds are represented for example by the general formula

RG-R$^4$-DG in which
RG is at least one isocyanate-reactive group,
DG is at least one actively dispersing group and
R$^4$ is an aliphatic, cycloaliphatic or aromatic radical comprising 1 to 20 carbon atoms.

Examples of RG are —OH, —SH, —NH$_2$ or —NHR$^5$, where R$^5$ can be methyl, ethyl, iso-propyl, n-propyl, n-butyl, iso-butyl, sec-butyl, tert-butyl, cyclopentyl or cyclohexyl.

Components of this kind are preferably, for example, mercaptoacetic acid, mercaptopropionic acid, thiolactic acid, mercaptosuccinic acid, glycine, iminodiacetic acid, sarcosine, alanine, β-alanine, leucine, isoleucine, aminobutyric acid, hydroxy-acetic acid, hydroxypivalic acid, lactic acid, hydroxysuccinic acid, hydroxydecanoic acid, dimethylolpropionic acid, dimethylolbutyric acid, ethylenediaminetriacetic acid, hydroxydodecanoic acid, hydroxyhexadecanoic acid, 12-hydroxystearic acid, amino-naphthalenecarboxylic acid, hydroxyethanesulfonic acid, hydroxypropanesulfonic acid, mercaptoethanesulfonic acid, mercaptopropanesulfonic acid, aminomethanesulfonic acid, taurine, aminopropanesulfonic acid, N-cyclohexylaminopropanesulfonic acid, N-cyclohexylaminoethanesulfonic acid and also the alkali metal, alkaline earth metal or ammonium salts thereof and, with particular preference, the stated monohydroxy-carboxylic and monohydroxysulfonic acids and also monoaminocarboxylic and monoaminosulfonic acids.

Very particular preference is given to dihydroxyalkylcarboxylic acids, especially those having 3 to 10 carbon atoms, as also described in U.S. Pat. No. 3,412,054. Of particular preference are compounds of the general formula

HO—R$^1$—CR$^3$(COOH)—R$^2$—OH in which R$^1$ and R$^2$ are each a C$_1$- to C$_4$-alkanediyl unit and R$^3$ is a C$_1$- to C$_4$-alkyl unit. Of especial preference are dimethylolbutyric acid and particularly dimethylolpropionic acid (DMPA).

Also suitable are corresponding dihydroxysulfonic acids and dihydroxyphosphonic acids such as 2,3-dihydroxypropanephosphonic acid and also the corresponding acids in which at least one hydroxyl group has been replaced by an amino group, examples being those of the formula

H$_2$N—R$^1$—CR$^3$(COOH)—R$^2$—NH$_2$ in which R$^1$, R$^2$ and R$^3$ can have the same meanings as specified above.

Otherwise suitable are dihydroxy compounds having a molecular weight above 500 to 10 000 g/mol and at least 2 carboxylate groups, which are known from DE-A 4 140 486. They are obtainable by reacting dihydroxyl compounds with tetracarboxylic dianhydrides such as pyromellitic dianhydride or cyclopentanetetra-carboxylic dianhydride in a molar ratio of from 2:1 to 1.05:1 in a polyaddition reaction. Particularly suitable dihydroxy compounds are the monomers (b2) listed as chain extenders and also the diols (b1).

Potentially ionic hydrophilic groups are, in particular, those which can be converted by simple neutralization, hydrolysis or quaternization reactions into the above-mentioned ionic hydrophilic groups, examples thus being acid groups, anhydride groups or tertiary amino groups.

Ionic monomers (d) or potentially ionic monomers (d) are described in detail in, for example, Ullmanns Ecyklopädie der technischen Chemie, 4th edition, Volume 19, pp. 311-313 and, for example, in DE-A 1 495 745.

Monomers having tertiary amino groups, in particular, are of special practical significance as potentially cationic monomers (d), examples being the following: tris(hydroxyalkyl) amines, N,N'-bis(hydroxyalkyl)alkylamines, N-hydroxyalkyl-dialkylamines, tris(aminoalkyl)amines, N,N'-bis (aminoalkyl)alkylamines and N-aminoalkyl-dialkylamines, the alkyl radicals and alkanediyl units of these tertiary amines consisting independently of one another of 2 to 6 carbons. Also suitable are polyethers containing tertiary nitrogen atoms and preferably two terminal hydroxyl groups, such as are obtainable in conventional manner by, for example, alkoxylating amines having two hydrogen atoms attached to amine nitrogen, examples being methylamine, aniline and N,N'-dimethylhydrazine. Polyethers of this kind generally have a molar weight of between 500 and 6000 g/mol.

These tertiary amines are converted either with acids, preferably strong mineral acids such as phosphoric acid, sulfuric acid or hydrohalic acids, or strong organic acids, such as formic, acetic or lactic acid, or by reaction with appropriate quaternizing agents such as C$_1$ to C$_6$ alkyl halides, bromines or chlorides for example, or di-C$_1$ to C$_6$ alkyl sulfates or di-C$_1$ to C$_6$ alkyl carbonates, into the ammonium salts.

Suitable monomers (d) having isocyanate-reactive amino groups include amino-carboxylic acids such as lysine, β-alanine, the adducts, specified in DE-A2034479, of aliphatic diprimary diamines with a,β-unsaturated carboxylic acids such as N-(2-amino-ethyl)-2-aminoethanecarboxylic acid, and also the corresponding N-aminoalkylamino-alkylcarboxylic acids, the alkanediyl units being composed of 2 to 6 carbon atoms.

Where monomers containing potentially ionic groups are used they can be converted into the ionic form before or during, but preferably after, the isocyanate polyaddition, since the ionic monomers are often only of very sparing solubility in the reaction mixture. With particular preference the anionic hydrophilic groups are in the form of their salts with an alkali metal ion or an ammonium ion as counterion.

Among these specified compounds, hydroxycarboxylic acids are preferred, particular preference being given to dihydroxyalkylcarboxylic acids and very particular preference to a,a-bis(hydroxymethyl)carboxylic acids, particularly dimethylolbutyric acid and dimethylolpropionic acid and especially dimethylolpropionic acid.

In one alternative embodiment the polyurethanes may comprise not only nonionic hydrophilic groups but also ionic hydrophilic groups, preferably nonionic hydrophilic groups and anionic hydrophilic groups simultaneously.

Within the field of polyurethane chemistry is general knowledge how the molecular weight of the polyurethanes can be adjusted by choosing the fractions of the co-reactive monomers and by the arithmetic mean of the number of reactive functional groups per molecule.

Normally components (a), (b), (c) and (d) and their respective molar amounts are chosen such that the ratio A:B, where
A) is the molar amount of isocyanate groups and
B) is the sum of the molar amount of the hydroxyl groups and the molar amount of the functional groups which are able to react with isocyanates in an addition reaction,
is from 0.5:1 to 2:1, preferably from 0.8:1 to 1.5 and more preferably from 0.9:1 to 1.2:1. With very particular preference the ratio A:B is as close as possible to 1:1.

In addition to components (a), (b), (c) and (d) use is made of monomers containing only one reactive group generally in amounts of up to 15 mol %, preferably up to 8 mol %, based on the total amount of components (a), (b), (c) and (d).

The polyaddition of components (a) to (d) takes place in general at reaction temperatures of 20 to 180° C., preferably 50 to 150° C., under atmospheric pressure.

The reaction times required normally extend from a few minutes to several hours. It is known within the field of polyurethane chemistry how the reaction time is influenced by a multiplicity of parameters such as temperature, monomer concentration and monomer reactivity.

For accelerating the reaction of the diisocyanates it is possible to use the conventional catalysts. Those suitable in principle are all catalysts commonly used in polyurethane chemistry.

These are, for example, organic amines, particularly tertiary aliphatic, cycloaliphatic or aromatic amines, and/or Lewis-acidic organometallic compounds. Examples of suitable Lewis-acidic organometallic compounds include tin compounds, such as tin(II) salts of organic carboxylic acids, such as tin(II) acetate, tin(II) octoate, tin(II) ethylhexoate and tin(II) laurate, and the dialkyltin(IV) salts of organic carboxylic acids, such as dimethyltin diacetate, dibutyltin diacetate, dibutyltin dibutyrate, dibutyltin bis(2-ethylhexanoate), dibutyltin dilaurate, dibutyltin maleate, dioctyltin dilaurate and dioctyltin diacetate. Metal complexes such as acetylacetonates of iron, titanium, aluminum, zirconium, manganese, nickel and cobalt are also possible. Further metal catalysts are described by Blank et al. in Progress in Organic Coatings, 1999, Vol. 35, pages 19-29.

Preferred Lewis-acidic organometallic compounds are dimethyltin diacetate, dibutyltin dibutyrate, dibutyltin bis(2-ethylhexanoate), dibutyltin dilaurate, dioctyltin dilaurate, zirconium acetylacetonate and zirconium 2,2,6,6-tetramethyl-3,5-heptanedionate.

Bismuth and cobalt catalyst as well, and also cesium salts, can be used as catalysts. Suitable cesium salts include those compounds in which the following anions are used: $F^-$, $Cl^-$, $ClO^-$, $ClO_3^-$, $ClO_4^-$, $Br^-$, $I^-$, $IO_3^-$, $CN^-$, $OCN^-$, $NO_2^-$, $NO_3^-$, $HCO_3^-$, $CO_3^{2-}$, $S^{2-}$, $SH^-$, $HSO_3^-$, $SO_3^{2-}$, $HSO_4^-$, $SO_4^{2-}$, $S_2O_2^{2-}$, $S_2O_4^{2-}$, $S_2O_5^{2-}$, $S_2O_6^{2-}$, $S_2O_7^{2-}$, $S_2O_8^{2-}$, $H_2PO_2^-$, $H_2PO_4^-$, $HPO_4^{2-}$, $PO_4^{3-}$, $P_2O_7^{4-}$, $(OC_nH_{2n+1})^-$, $(C_nH_{2n-1}O_2)^-$, $(C_nH_{2n-3}O_2)^-$ and $(C_{n+1}H_{2n-2}O_4)^{2-}$, n standing for numbers from 1 to 20.

Preference is given to cesium carboxylates where the anion conforms to the formulae $(C_nH_{2n-1}O_2)^-$ and $(C_{n+1}H_{2n-2}O_4)^{2-}$ with n being 1 to 20. Particularly preferred cesium salts contain monocarboxylate anions of the general formula $(C_nH_{2n-1}O_2)^-$, where n stands for numbers from 1 to 20. Mention may be made in particular here of the formate, acetate, propionate, hexanoate and 2-ethylhexanoate.

Suitable polymerization apparatus includes stirred tanks, particularly when solvents are used to ensure a low viscosity and effective heat removal.

If the reaction is carried out in bulk suitable equipment, because of the generally high viscosities and the generally short reaction times, includes in particular extruders, especially self-cleaning multiscrew extruders.

In the prepolymer mixing technique a prepolymer which carries isocyanate groups is prepared first of all. In this case components (a) to (d) are chosen such that at the above-defined ratio A:B is greater than 1.0 to 3, preferably 1.05 to 1.5. The prepolymer is first dispersed in water and is crosslinked simultaneously and/or subsequently by reacting the isocyanate groups with amines which carry more than 2 isocyanate-reactive amino groups, or is chain extended with amines which carry 2 isocyanate-reactive amino groups. Chain extension also takes place when no amine is added. In that case isocyanate groups are hydrolyzed to amine groups, which react with residual isocyanate groups at the prepolymers and so extend the chain.

The average particle size (z-average) as measured by means of dynamic light scattering with the Malvern® Autosizer 2 C of the dispersions prepared in accordance with the invention is not critical to the invention and is generally <1000 nm, preferably <500 nm, more preferably <200 nm and very preferably between 20 and below 200 nm.

The dispersions generally have a solids content of from 10 to 75%, preferably from 20 to 65%, by weight and a viscosity of from 10 to 500 mPas (measured at a temperature of 20° C. and at a shear rate of 250 $s^{-1}$).

For certain applications it may be rational to adjust the dispersions to a different solids content, preferably a lower solids content, by diluting them for example.

The dispersions prepared in accordance with the invention may additionally be mixed with other components typical for the cited applications, examples being surfactants, detergents, dyes, pigments, color transfer inhibitors and optical brighteners.

The dispersions can be subjected to physical deodorization, if desired, following their preparation.

Physical deodorization may involve stripping the dispersion using steam, an oxygen-containing gas, preferably air, nitrogen or supercritical carbon dioxide in, for example, a stirred vessel, as described in DE-B 12 48 943, or in a countercurrent column, as described in DE-A 196 21 027.

The amount of the substituted N-(cyclo)alkylpyrrolidone of the invention in the preparation of the polyurethane is generally chosen such that the fraction in the finished dispersion does not exceed 30%, preferably not more than 25%, more preferably not more than 20% and very preferably not more than 15% by weight.

The fraction of substituted N-(cyclo)alkylpyrrolidone in the completed dispersion is generally at least 0.01%, preferably at least 0.1%, more preferably at least 0.2, very preferably at least 0.5%, and in particular at least 1% by weight.

The aqueous polyurethane formulations of the invention are suitable advantageously for coating and bonding substrates. Suitable substrates are wood, wood veneer, paper, paperboard, cardboard, textile, leather, nonwoven, surfaces of plastics, glass, ceramic, mineral building materials and uncoated or coated metals. They find application, for example, in the production of films or thin sheets, for impregnating textiles or leather, as dispersants, as pigment grinding agents, as primers, as adhesion promoters, as hydrophobicizers, as a laundry detergent additive or as an additive to cosmetic formulations, or for producing moldings or preparing hydrogels.

In the context of their use as coating materials the polyurethane dispersions can be employed in particular as primers, surfacers, pigmented topcoat materials and clearcoat materials in the automotive refinishing or large-vehicle finishing sector. The coating materials are especially suitable for applications that call for particularly high application reliability, exterior weathering stability, optical qualities, solvent resistance, chemical resistance and water resistance, such as in automotive refinish and large-vehicle finishing.

The inventive preparation of the polyurethanes in the presence of substituted N-(cyclo)alkylpyrrolidones leads to at least one of the following advantages:

Reduced solvent requirement.
The dispersions are easier to apply by spraying or through nozzles, since encrustation or contamination on spraying tools is reduced.
Lower toxicity than, for example, N-methylpyrrolidone.
The prepolymer solutions have a lower viscosity.
The rheology of the polyurethane dispersions is improved.
The wetting behavior of substrates or additives is improved.
Lower yellowing under light and/or heat exposure.
Greater frost resistance of the dispersions.
Improved flexibility, particularly lower-temperature flexibility, of the resultant films.
Higher gloss of the resultant films.
Enhanced film leveling.
Enhanced film-forming properties.

Whereas the subsequent addition of N-alkylpyrrolidones, as known from the prior art, serves merely to adjust physical parameters of the finished dispersion, the inventive preparation of polyurethanes in the presence of substituted N-(cyclo) alkylpyrrolidones leads to advantages associated with the preparation of the polyurethanes, which would not be possible to achieve by subsequent addition. One possible reason for this might be that the polyurethanes prepared inventively absorb the substituted N-(cyclo)alkylpyrrolidone by swelling, for example, over the whole of the cross section, whereas in the case of subsequent addition only superficial absorption, at best, can take place.

The present invention further provides coating compositions comprising at least one polymer dispersion of the invention, and also articles coated therewith.

ppm figures and percentages used in this specification relate, unless otherwise stated, to weight percentages and ppm by weight.

ABBREVIATIONS

DETA diethylenetriamine
DMEA dimethylethanolamine
DMP mixture of 1,3- and 1,4-dimethylpyrrolidone (weight ratio 2:1)
DMPA dimethylolpropionic acid
IPDA isophoronediamine
IPDI isophorone diisocyanate
NEP N-ethylpyrrolidone
NMP N-methylpyrrolidone
PUD polyurethane dispersion
TEA triethylamine

EXAMPLES

Example A1 with DMP

A stirring flask with reflux condenser and thermometer was charged with 400 g (0.40 mol) of a polyesterdiol formed from adipic acid, isophthalic acid and hexane-1,6-diol with an OH number of 112, 54.0 g (0.40 mol) of DMPA and 80 g of DMP, and this initial charge was stirred at 50° C. 233.4 g (1.05 mol) of IPDI were added and the mixture was stirred at 90° C. for 80 minutes. Thereafter it was diluted with 700 g of acetone and the NCO content was found to be 1.40% by weight (calculated: 1.43%). Then 28.5 g (0.32 mol) of DMEA were added. Following dispersion with 1200 g of water, a mixture of 21.3 g (0.125 mol) of IPDA, 8.6 g (0.083 mol) of DETA and 40 g of water was added and the acetone was removed by distillation under reduced pressure. This gave a finely divided PUD with a 36.6% solids content.

Comparative Example A2 with NMP

Example A1 was repeated but with 80 g of NMP instead of the DMP. The NCO content was found to be 1.44% by weight (calculated: 1.43%).
A finely divided PUD with a 36.7% solids content was obtained.

Comparative Example A3 with NEP

Example A1 was repeated but with 80 g of NEP instead of the DMP. The NCO content was found to be 1.42% by weight (calculated: 1.43%).
A finely divided PUD with a 36.7% solids content was obtained.

The examples were tested as a varnish on wood, with the following results:

| | Example A1 | Comparative example A2 | Comparative example A3 |
|---|---|---|---|
| NVC [%] | 36.6 | 36.7 | 36.7 |
| pH | 8.4 | 8.3 | 8.4 |
| MFFT (dispersion alone) [° C.] | 0 | 0 | 0 |
| LT [%] | 97.9 | 97.8 | 98.8 |
| particle size [nm] | 67 | 63 | 52 |
| viscosity [mPas] | 411 | 321 | 418 |
| MFFT (dispersion alone) [° C.] | 0 | 0 | 0 |
| pendulum damping after 24 h 60° C. | 46 | 49 | 49 |
| Chem. test after 16 h 60° C. | | | |
| sodium carbonate | 0 | 0 | 0 |
| red wine | 1.5 | 1.5 | 1.5 |
| instant coffee | 2 | 2 | 2 |
| blackcurrant juice | 0 | 0 | 0 |
| EE-Buac | 0 | 0 | 0 |
| mustard | 4 | 4 | 4 |
| olive oil | 0 | 0 | 0 |
| disinfectant | 0 | 0 | 0 |
| black ballpoint pen taste | 5 | 5 | 5 |
| cleaner | 3 | 3 | 3 |
| chemical resistance (average value) name | 1.55 | 1.55 | 1.55 |
| grain highlighting | no difference to comparison | comparison | no difference to comparison |
| water vapor resistance, immediate | 2.5 | 2.5 | 2.5 |
| water vapor resistance, 1 d | 2 | 2 | 2 |
| water resistance, 24 h room temperature | 0.5 | 0.5 | 0.5 |
| plasticizer test, immediate | 1 | 1 | 1 |
| plasticizer test, 1 d | 1 | 1 | 1 |
| testing agent alcohol, immediate | 4 | 4 | 4 |
| hand cream resistance 2 h 60° C./appearance of film | 0.5 | 0.5 | 0.5 |
| hardness of coating without hand cream | 10 | 10 | 10 |
| force before film destroyed [N] | 5 | 5 | 5 |

The numbers here denote the best (1) and worst (5) scores.

Example B1

A stirring flask with reflux condenser and thermometer was charged with 215 g (0.105 mol) of a polyesterdiol formed from adipic acid, neopentyl glycol and hexane-1,6-diol with an OH number of 55, 12.82 g (0.096 mol) of DMPA and 79 g of DMP and this initial charge was stirred at 80° C. until the DMPA had dissolved. 67.1 g (0.302 mol) of IPDI were added and the mixture was stirred at 95° C. for 210 minutes. Thereafter it was cooled to 50° C. and the NCO content was found to be 2.15% by weight (calculated: 2.26%). Then 9.68 g (0.096 mol) of TEA were added. The prepolymer solution was added to 584 g of water and dispersed. Then a mixture of 5.46 g (0.091 mol) of EDA and 26 g of water was added.

A finely divided PUD with a 30% solids content was obtained.

Example B2

A stirring flask with reflux condenser and thermometer was charged with 231 g (0.113 mol) of a polypropylene oxide with an OH number of 55, 13.32 g (0.099 mol) of DMPA and 40 g of DMP and this initial charge was stirred at 80° C. until the DMPA had dissolved. 94.5 g (0.426 mol) of IPDI were added and the mixture was stirred at 95° C. for 120 minutes. Thereafter it was cooled to 40° C. and the NCO content was found to be 4.50% by weight (calculated: 4.72%). Then 9.56 g (0.095 mol) of TEA were added. The prepolymer solution was added to 584 g of water and dispersed. Then a mixture of 11.56 g (0.193 mol) of EDA and 25 g of water was added.

A finely divided PUD with a 30% solids content was obtained.

Comparative Example B3

Example B1 was repeated but with 79 g of NMP instead of the DMP. The NCO content was found to be 2.19% by weight (calculated: 2.26%)

A finely divided PUD with a 30% solids content was obtained.

Comparative Example B4

Example B2 was repeated but with 40 g of NMP instead of the DMP. The NCO content was found to be 4.50% by weight (calculated: 4.72%)

A finely divided PUD with a 30% solids content was obtained.

The invention claimed is:

1. An aqueous polyurethane dispersion comprising a substituted N-(cyclo)alkylpyrrolidone (SCAP) of formula (1)

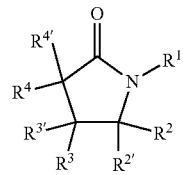

(1)

wherein
$R^1$ is an alkyl radical having 1 to 18 C atoms or a cycloalkyl radical having 3 to 18 C atoms, and
$R^2$, $R^{2'}$, $R^3$, $R^{3'}$, $R^4$ and $R^{4'}$ are each independently selected from the group consisting of a hydrogen atom, an alkyl radical having 1 to 18 C atoms and a cycloalkyl radical having 3 to 18 C atoms,
wherein at least one selected from the group consisting of $R^2$, $R^{2'}$, $R^3$, $R^{3'}$, $R^4$ and $R^{4'}$ is not a hydrogen atom.

2. The dispersion of claim 1, comprising 0.01% to 30% by weight the substituted N-(cyclo)alkylpyrrolidone, based on the total weight of the dispersion.

3. A process for preparing a polyurethane dispersion, the process comprising:
(I) preparing a polyurethane by reacting a diisocyanate or polyisocyanate with a diol in the presence of a substituted N-(cyclo)alkylpyrrolidone (SCAP) of formula (1)

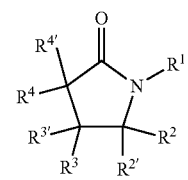

(1)

wherein
$R^1$ is an alkyl radical having 1 to 18 C atoms or a cycloalkyl radical having 3 to 18 C atoms, and
$R^2$, $R^{2'}$, $R^3$, $R^{3'}$, $R^4$ and $R^{4'}$ are each independently selected from the group consisting of a hydrogen atom, an alkyl radical having 1 to 18 C atoms and a cycloalkyl radical having 3 to 18 C atoms,
wherein at least one selected from the group consisting of $R^2$, $R^{2'}$, $R^3$, $R^{3'}$, $R^4$ and $R^{4'}$ is not a hydrogen atom; and then
(II) dispersing the polyurethane in water,
to obtain a polyurethane dispersion.

4. The process for preparing a polyurethane dispersion of claim 3, wherein the polymerizing (I) comprises reacting
a) at least one difunctional or polyfunctional isocyanate having 4 to 30 carbon atoms,
b) at least one diol comprising
 (i) 10 to 100 mol %, based on the total amount of the at least one diol (b), of a diol having a molecular weight of 500 to 5000, and
 (ii) 0 to 90 mol %, based on the total amount of the at least one diol (b), of a diol having a molecular weight of 60 to 500 g/mol,
c) optionally at least one polyfunctional compound, other than the at least one diol (b), comprising at least one reactive group selected from the group consisting of an alcoholic hydroxyl group, a primary amino group, and a secondary amino group, and
d) optionally at least one monomer other than a), b), and c), comprising
 (i) an isocyanate group or a group which is reactive with an isocyanate group, and
 (ii) a hydrophilic group,
to obtain a polyurethane,
and wherein the process optionally further comprises adding a polyamine during or after the dispersing (II).

5. The dispersion of claim 1, wherein $R^1$ is selected from the group consisting of methyl, ethyl and cyclohexyl.

6. The dispersion of claim 1, wherein $R^2$, $R^{2'}$, $R^3$, $R^{3'}$, $R^4$ and $R^{4'}$ are each independently selected from the group consisting of hydrogen, methyl, ethyl, iso-propyl and cyclohexyl, wherein at least one selected from the group consisting of $R^2$, $R^{2\prime}$, $R^3$, $R^{3\prime}$, $R^4$ and $R^{4\prime}$ is not a hydrogen atom.

7. The dispersion of claim 1, wherein the substituted N-(cyclo)alkylpyrrolidone is at least one pyrrolidone selected from the group consisting of N-methyl-3-methylpyrrolidone, N-methyl-4-methylpyrrolidone, N-ethyl-3-methylpyrrolidone and N-ethyl-4-methylpyrrolidone.

8. A method for coating or adhesively bonding an object, the method comprising contacting the polyurethane dispersion of claim 1 with at least one object selected from the group consisting of a wood, a wood veneer, a paper, a paperboard, a cardboard, a textile, a leather, a nonwoven, a plastic surface, a glass, a ceramic, a mineral building material, an uncoated metal, and a coated metal.

9. A polyurethane dispersion obtained by the process of claim 3.

10. The dispersion of claim 1, wherein $R^1$ is methyl.

11. The dispersion of claim 1, wherein $R^2$, $R^{2\prime}$, $R^3$, $R^{3\prime}$, $R^4$ and $R^{4\prime}$ are each independently hydrogen or methyl, and wherein at least one selected from the group consisting of $R^2$, $R^{2\prime}$, $R^3$, $R^{3\prime}$, $R^4$ and $R^{4\prime}$ is methyl.

12. The dispersion of claim 1, wherein exactly one selected from the group consisting of $R^2$, $R^{2\prime}$, $R^3$, $R^{3\prime}$, $R^4$ and $R^{4\prime}$ is not a hydrogen atom.

13. The dispersion of claim 1, comprising N-methyl-3-methylpyrrolidone and N-methyl-4-methylpyrrolidone.

14. The dispersion of claim 13, wherein a weight ratio of N-methyl-3-methylpyrrolidone to N-methyl-4-methylpyrrolidone is in a range of 2:1 to 1:2.

15. The process of claim 4, wherein the at least one difunctional or polyfunctional isocyanate comprises 2,4-diisocyanatotoluene, 2,6-diisocyanatotoluene, or both.

16. The process of claim 4, wherein the at least one diol comprises a polyesterpolyol, a polyetherdiol, or both.

17. The dispersion of claim 1, comprising 1% to 15% by weight of the substituted N-(cyclo)alkylpyrrolidone, based on the total weight of the dispersion.

* * * * *

UNITED STATES PATENT AND TRADEMARK OFFICE
CERTIFICATE OF CORRECTION

PATENT NO. : 8,575,244 B2  
APPLICATION NO. : 13/375923  
DATED : November 5, 2013  
INVENTOR(S) : Gerd Buelow et al.

Page 1 of 1

It is certified that error appears in the above-identified patent and that said Letters Patent is hereby corrected as shown below:

On the title page, Item (54), and in the specification, Column 1, the Title is incorrect. Item (54) and Column 1 should read:

--SOLVENTS IN THE PREPARATION OF POLYURETHANE DISPERSIONS--

On the title page, Item (75), the 1$^{st}$ Inventor's city of residence is incorrect. Item (75) should read:

--(75)  Inventors: Gerd Buelow, Maxdorf (DE); Manfred Dargatz, Worms (DE); Karl Haeberle, Speyer (DE); Maria Teresa Hechavarria Fonseca, Buerstadt (DE); Karl Ott, Plankstadt (DE); Juan Salgado-Valle, Hospitalet de Llobregat (ES); Tobias Wabnitz, Mannheim (DE)--

Signed and Sealed this  
Twenty-eighth Day of January, 2014

Michelle K. Lee  
*Deputy Director of the United States Patent and Trademark Office*